(12) United States Patent
Hall et al.

(10) Patent No.: US 7,698,395 B2
(45) Date of Patent: Apr. 13, 2010

(54) CONTROLLING START UP IN A NETWORK

(75) Inventors: Brendan Hall, Eden Prairie, MN (US); Kevin R. Driscoll, Maple Grove, MN (US)

(73) Assignee: Honeywell International Inc., Morristown, NJ (US)

(*) Notice: Subject to any disclaimer, the term of this patent is extended or adjusted under 35 U.S.C. 154(b) by 1077 days.

(21) Appl. No.: 10/993,215

(22) Filed: Nov. 19, 2004

(65) Prior Publication Data

US 2005/0141524 A1    Jun. 30, 2005

Related U.S. Application Data (60) Provisional application No. 60/560,323, filed on Apr. 6, 2004, provisional application No. 60/523,785, filed on Nov. 19, 2003, provisional application No. 60/523,782, filed on Nov. 19, 2003, provisional application No. 60/523,896, filed on Nov. 19, 2003, provisional application No. 60/523,783, filed on Nov. 19, 2003, provisional application No. 60/523,900, filed on Nov. 19, 2003, provisional application No. 60/523,899, filed on Nov. 19, 2003.

(51) Int. Cl.
*G06F 15/13* (2006.01)
(52) U.S. Cl. .................. 709/222; 709/203; 709/219; 709/223; 709/249; 370/230; 370/338; 370/507
(58) Field of Classification Search .......... 709/203, 709/219, 222, 223, 249; 370/230, 338, 507
See application file for complete search history.

(56) References Cited

U.S. PATENT DOCUMENTS

| | | | |
|---|---|---|---|
| 4,417,334 A | 11/1983 | Gunderson et al. |
| 4,428,046 A | 1/1984 | Chari et al. |
| 4,630,254 A | 12/1986 | Tseng |
| 4,631,718 A | 12/1986 | Miyao |
| 4,740,958 A | 4/1988 | Duxbury et al. |

(Continued)

FOREIGN PATENT DOCUMENTS

AT    407582    4/2001

(Continued)

OTHER PUBLICATIONS

Temple, "Avoiding the babbling-idiot failure in a time triggered communication system", Fault-Tolerant Computing, 1998, Digest of Papers, Twenty-Eighth Annual International Syposium on Munich, Germany Jun. 23-25, 1998, Los Alamitos, CA, USA, IEEE Comput. Soc. US, Jun. 23, 1998, pp. 218-227, XP01291298, ISBN:0-8186-8470-4.

(Continued)

*Primary Examiner*—Jinsong Hu
(74) *Attorney, Agent, or Firm*—Fogg & Powers LLC (57) ABSTRACT

A method for controlling start-up of a network is provided. The method includes receiving a message from one node of a plurality of nodes at a hub while the network is in an unsynchronized state, relaying the message to the other nodes of the plurality of nodes of the network independent of the content of the message, and blocking all messages from the one node of the plurality of nodes until a relaying condition is met.

24 Claims, 6 Drawing Sheets

U.S. PATENT DOCUMENTS

| | | |
|---|---|---|
| 4,856,023 A | 8/1989 | Singh |
| 4,866,606 A | 9/1989 | Kopetz |
| 5,161,153 A * | 11/1992 | Westmore .................. 370/407 |
| 5,341,232 A | 8/1994 | Popp |
| 5,557,778 A | 9/1996 | Vaillancourt |
| 5,896,508 A | 4/1999 | Lee |
| 5,903,565 A | 5/1999 | Neuhaus et al. |
| 6,317,415 B1 * | 11/2001 | Darnell et al. ............. 370/230 |
| 6,513,092 B1 | 1/2003 | Gorshe |
| 6,980,537 B1 * | 12/2005 | Liu ........................... 370/338 |
| 2005/0094674 A1 * | 5/2005 | Zinke et al. ................. 370/507 |

FOREIGN PATENT DOCUMENTS

| | | |
|---|---|---|
| WO | WO 01/13230 A1 | 2/2001 |
| WO | WO 03/069843 A2 | 8/2003 |

OTHER PUBLICATIONS

Poledena et al., "TTP/C—Fault-Tolerant Real-Time Communication with Integrated High Level Services", TTTech—Time Triggered Technology, Jan. 24, 2000, XP002249095.

* cited by examiner

CONTROLLING START UP IN A NETWORK

CROSS REFERENCE To RELATED APPLICATIONS

This application is related to and claims the benefit of the filing date of the following provisional applications:

Ser. No. 60/523,899, entitled "CONTROLLED START UP IN A TIME DIVISION MULTIPLE ACCESS SYSTEM" filed on Nov. 19, 2003.

Ser. No. 60/523,900 entitled "COMMUNICATION FAULT CONTAINMENT VIA INDIRECT DETECTION," filed on Nov. 19, 2003.

Ser. No. 60/523,783 entitled "PARASITIC TIME SYNCHRONIZATION FOR A CENTRALIZED TDMA BASED COMMUNICATIONS GUARDIAN" filed on Nov. 19, 2003.

Ser. No. 60/523,896 entitled "VOTING MECHANISM FOR TRANSMISSION SCHEDULE ENFORCEMENT," filed on Nov. 19, 2003.

Ser. No. 60/523,782, filed on Nov. 19, 2003 and entitled "HUB WITH INDEPENDENT TIME SYNCHRONIZATION" (the '782 Application).

Ser. No. 60/523,785, filed on Nov. 19, 2003 and entitled "PRIORITY BASED ARBITRATION FOR TDMA SCHEDULE ENFORCEMENT IN A DUAL CHANNEL SYSTEM" (the '785 Application).

Ser. No. 60/560,323, filed on Apr. 6, 2004, and entitled "MESSAGE AUTHENTICATION IN A COMMUNICATION NETWORK" (the '323 Application).

Each of these provisional applications is incorporated herein by reference.

This application is also related to the following co-pending non-provisional patent applications:

Ser. No. 10/993,916 entitled "COMMUNICATION FAULT CONTAINMENT VIA INDIRECT DETECTION," filed on even date herewith.

Ser. No. 10/993,221 entitled "PARASITIC TIME SYNCHRONIZATION FOR A CENTRALIZED TDMA BASED COMMUNICATIONS GUARDIAN," filed on even date herewith.

Ser. No. 10/993,910 entitled "VOTING MECHANISM FOR TRANSMISSION SCHEDULE ENFORCEMENT" filed on even date herewith.

Ser. No. 10/993,926 entitled "PRIORITY BASED ARBITRATION FOR TDMA SCHEDULE ENFORCEMENT IN A MULTI-CHANNEL SYSTEM" filed on even date herewith (the '926 Application).

Ser. No. 10/993,911 entitled "ASYNCHRONOUS HUB" filed on even date herewith (the '911 Application).

Ser. No. 10/993,164 entitled "PORT DRIVEN AUTHENTICATION IN A NETWORK" filed on even date herewith (the '164 Application).

Each of these non-provisional applications is incorporated herein by reference.

BACKGROUND

Communication networks are used in a variety of applications including telephone and computer systems, weapons systems, navigational systems, and advanced control systems in cars, aircraft and other complex systems. Given the variety of applications, many kinds of communications networks have been developed over the years. One common characteristic of communication networks is the use of a communication medium that interconnects various nodes on the network. Various topologies and protocols have been developed to control communications between the nodes of these networks.

One type of network is referred to as Time Division Multiple Access (TDMA). In a TDMA network, nodes in the network are assigned time slots for communicating over the network. Many different TDMA protocols have been developed for communication between nodes of a network. For example, these protocols include TTP/C, SAFEbus, FlexRay and other TDMA protocols.

In many time-triggered protocols, such as the TTP/C Specification, a guardian is used to monitor messages to prevent faulty messages from propagating through the network. Left unchecked, the nodes producing faulty transmissions can interfere with the ability of the other nodes to properly start up the network and bring it from an unsynchronized state to a synchronized state. The guardian often monitors messages to assure that transmission characteristics, including but not limited to, transmission rate and order, are acceptable. Through the guardian's analysis of the content of the frames, faulty transmissions are detected so as to limit their influence on network start up and operation. Unfortunately, due to the complexity of the communication system and protocol, the guardian is a complex component of the hub and typically requires a significant amount of hardware, software and testing to implement and maintain. This adds expense to the design and operation of a network with a central guardian.

Therefore, a need exists for a simpler mechanism for reducing the impact of faulty transmissions on network start up.

SUMMARY

Embodiments of the present invention provide a simpler mechanism for reducing the impact of faulty transmissions on network start up. In one embodiment, the hub blocks all messages by any particular node in the network after forwarding a message from the node until a relaying condition is met. For example, the relaying condition in one embodiment is entry of the network into a synchronous state. In other embodiments, the synchronization condition is messages transmitted by a selected number of other nodes, the lapse of a time that is sufficient for a network to enter a synchronous state, or any other appropriate criteria that allows the hub to limit the influence of the node on the start-up of the network without analyzing the message at the hub.

In one embodiment, a method for controlling start-up of a network is provided. The method includes receiving a message from one node of a plurality of nodes at a hub while the network is in an unsynchronized state, relaying the message to the other nodes of the plurality of nodes of the network independent of the content of the message, and blocking all messages from the one node of the plurality of nodes until a relaying condition is met.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide a network that uses a simplified guardian in a hub to reduce the impact of a faulty transmission during network start up. In one embodiment, the hub blocks all messages from a node once the node has sent one message during an unsynchronized state. In this manner, the hub is able to indirectly detect a faulty node and limit its affect on the network by effectively isolating the node for a limited time. The ability to indirectly detect the faulty node is also described in co-pending, Provisional Application Ser. No. 60/523,900, entitled "COMMUNICATION FAULT CONTAINMENT VIA INDIRECT DETECTION" and co-pending non-provisional patent application Ser. No. 10/993,916 entitled "COMMUNICATION FAULT CONTAINMENT VIA INDIRECT DETECTION."

Figure 1:
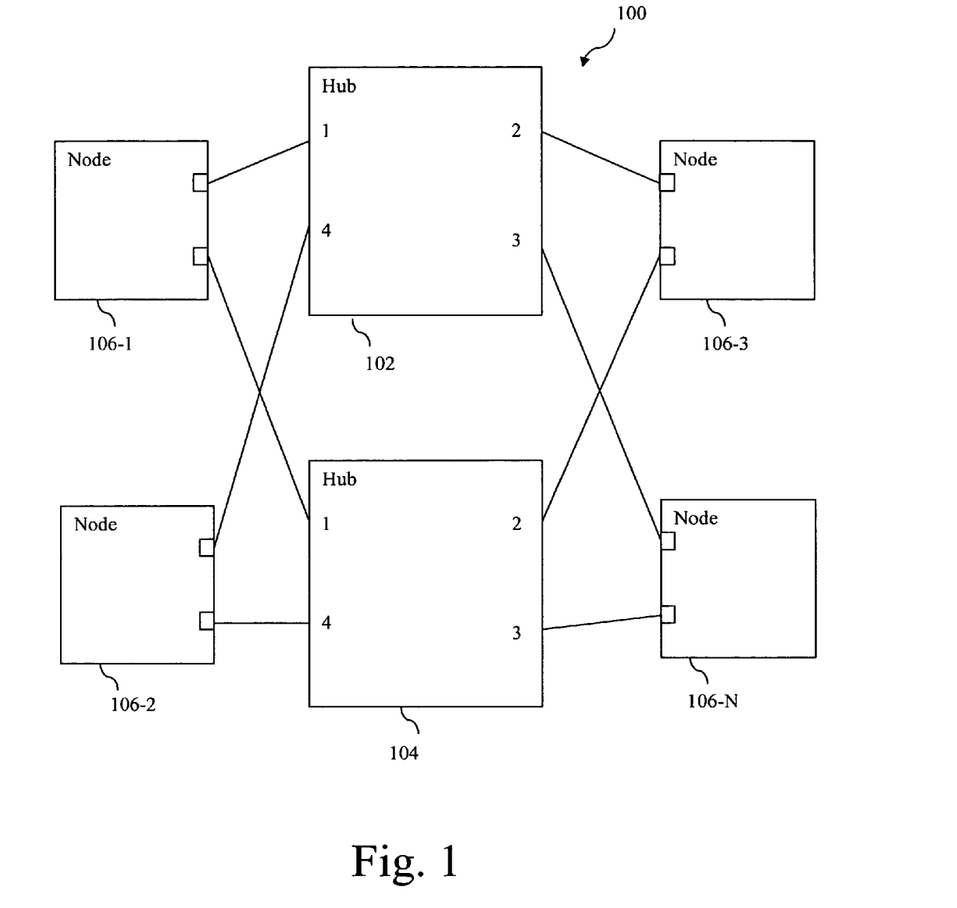
FIG. 1 is a block diagram of one embodiment of a star network that implements a distributed, time-triggered protocol with a hub that controls the influence of nodes in the network over start-up of the network without analyzing the content of messages from the nodes.

FIG. 1 is one embodiment of a network indicated generally at 100. Network 100 includes hubs 102 and 104 connected in a star configuration with nodes 106-1 to 106-N. Hubs 102 and 104 are referred to collectively as "the hub" of network 100. In this embodiment, network 100 includes two channels of communication for each node 106-1 to 106-N. Hub 102 provides the first communication channel between the nodes 106-1 to 106-N. Hub 104 provides the second communication channel between the nodes 106-1 to 106-N. Data is transmitted in messages, e.g., frames from one node to another in the network 100. Each node transmits each message to both of hubs 102 and 104. Hubs 102 and 104 then selectively transmit the messages to the other nodes to provide 1:N communication for each node.

In one embodiment, the network 100 implements a distributed, time-triggered communication protocol. For example, in one embodiment, the time-triggered protocol TTP/C is used. In other embodiments, other appropriate time division multiple access (TDMA) protocols are used in network 100.

In one embodiment, the nodes 106-1 to 106-N are assigned time slots to use for transmission in a synchronized state. To enter the synchronized state, at least one of the nodes 106-1 to 106-N sends a start-up signal in an unsynchronized state. In the TTP/C protocol this is referred to as a Cold Start Frame. The hub receives the start-up signal from one of the nodes 106-1 to 106-N and forwards it on to the other nodes of the network. When N or more of the nodes 106-1 to 106-N acknowledges the start-up signal, the network enters a synchronized state and each node transmits messages in its assigned time slot, where N is selected to achieve the required degree of fault tolerance, e.g., N is equal to 2 for single fault tolerance.

In one embodiment, the hubs 102 and 104 recognize the synchronized state based on reception of out-of-band signals. For example, in one embodiment, the hubs 102 and 104 detect synchronized state when beacons, e.g., action time signals, are received from the nodes 106-1 to 106-N as described in provisional application Ser. No. 60/523,783 entitled "PARASITIC TIME SYNCHRONIZATION FOR A CENTRALIZED TDMA BASED COMMUNICATIONS GUARDIAN" filed on Nov. 19, 2003 and non-provisional application Ser. No. 10/993,221 entitled "PARASITIC TIME SYNCHRONIZATION FOR A CENTRALIZED TDMA BASED COMMUNICATIONS GUARDIAN," filed on even date herewith. According to the TTP/C Standard, these action time signals indicate the determination of each node as to the beginning of the next time slot. In one embodiment, entrance into the synchronous state is determined based on guardian messages for voted schedule enforcement as described in co-pending provisional application Ser. No. 60/523,896 entitled "VOTING MECHANISM FOR TRANSMISSION SCHEDULE ENFORCEMENT," filed on Nov. 19, 2003 and non-provisional application Ser. No. 10/993,910 entitled "VOTING MECHANISM FOR TRANSMISSION SCHEDULE ENFORCEMENT" filed on even date herewith.

In operation, hubs 102 and 104 limit the influence of each of nodes 106-1 to 106-N on the start up procedure of the network 100 without analyzing the content of messages from the nodes. Assuming that network 100 is not synchronized, one of the nodes, e.g., 106-1, sends a start-up message, e.g., a Cold Start Frame message, to the hubs 102 and 104. Each hub 102 and 104 forwards the message on to the other nodes 106-2 to 106-N. In one embodiment, hubs 102 and 104 implement port driven authentication as described in the '323 Application and the '587 Application. In another embodiment, each node is limited to transmitting a start-up message on only one channel. In one embodiment, each node is assigned to a specific channel such that any given node could be assigned to any of the channels in the network.

In one embodiment, hubs 102 and 104 reduce the influence of a node on the start-up procedure by allowing one message to be sent in the unsynchronized state and then blocking all other messages from the node until a relaying condition is met. The hubs 102 and 104 keep track of blocks on a node-by-node basis. When the relaying condition is met, the block on the node is removed.

In one embodiment, the hubs 102 and 104 apply one or more relaying conditions to determine when to remove a block on a selected node that has been blocked due to transmitting a message in the unsynchronized state. First, in one embodiment, one relaying condition is based on the passage of enough time such that network synchronization should be achieved. The time is long enough for the message to be recognized and synchronous operation to commence. Further, the time should be longer than it takes for good nodes, having observed the transmission to back off, and one to send another subsequent start-up message, e.g., enough time for a failed start-up attempt to be recognized and a subsequent start up attempt initiated by another node to commence. With this, the time delay ensures that another node will have enough time to back off and recover from any erroneous behavior caused by the original sourced node, such that another node will source a good message and so start the network.

Figure 4:
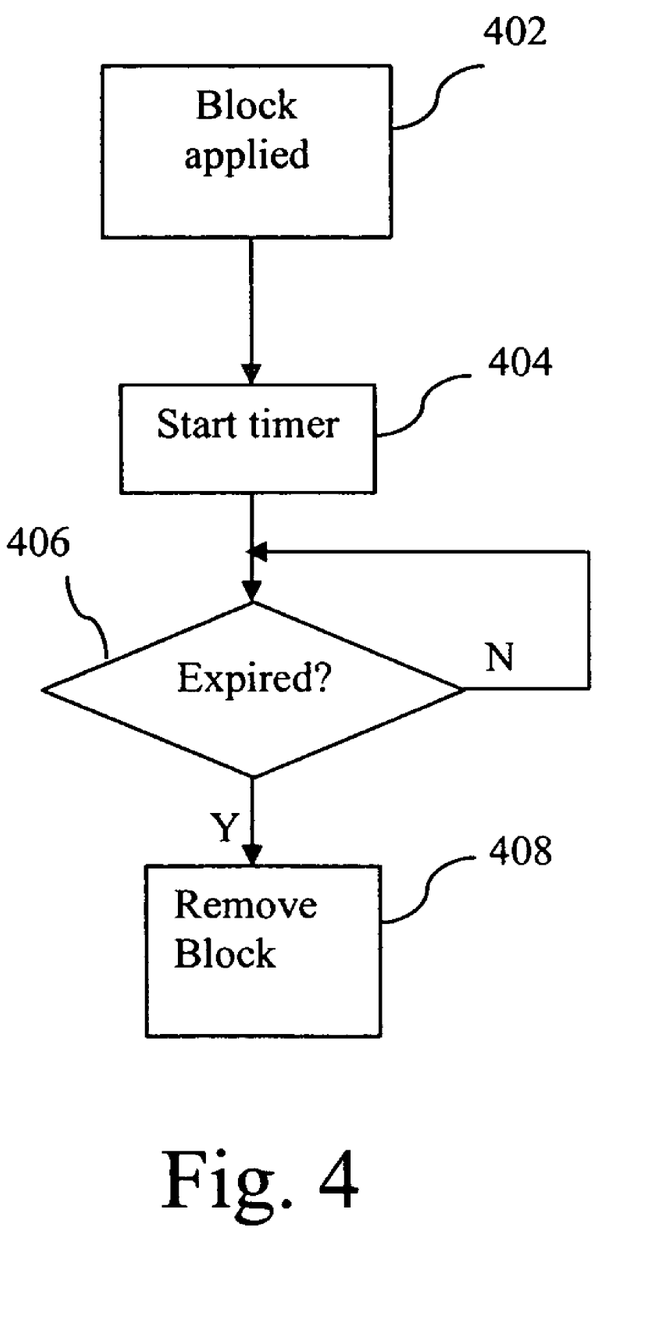
FIGS. 4, 5, and 6 are flow charts of embodiments of processes for implementing various relaying conditions for removing a block on a node in an unsynchronized state.

One embodiment of this relaying condition is shown and described with respect to FIG. 4. Further, in one embodiment, another relaying condition is based on transmissions by a selected number of other nodes in the unsynchronized state. With this condition, a block on a node is removed once the appropriate number of other nodes has transmitted. One embodiment of this relaying condition is described below with respect to FIG. 5. In another embodiment, another relaying condition is met when the network moves to the synchronized state such as shown and described with respect to FIG.

6. Other relaying conditions can be used that appropriately limit the influence of one node on the start-up procedure.

In other embodiments, only a single hub and single communication channel are provided. This is represented in FIG. 1 with the removal of one of the two hubs 102 or 104 and its connections to the nodes 106-1 to 106-N.

Figure 2:
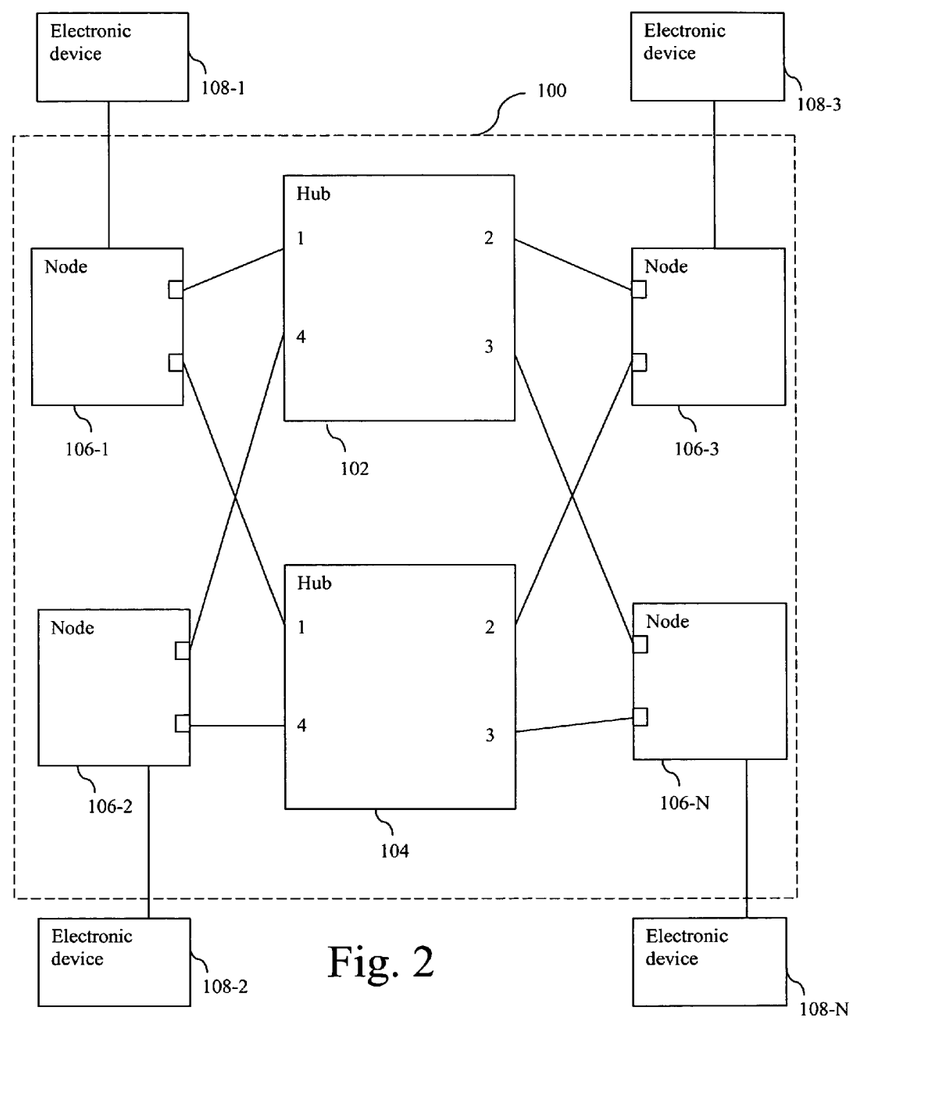
FIG. 2 is a block diagram of another embodiment of a star network in an electronic system.

FIG. 2 is a block diagram of a system indicated at 200 that uses a communication network 100 of the type describe above with respect to FIG. 1. FIG. 2 further shows that the nodes 106-1 to 106-N are connected to a number of electronic devices 208-1 to 208-N, e.g., sensors, processors, actuators, controllers, input devices and the like that communicate date in frames over the network 100.

Figure 3:
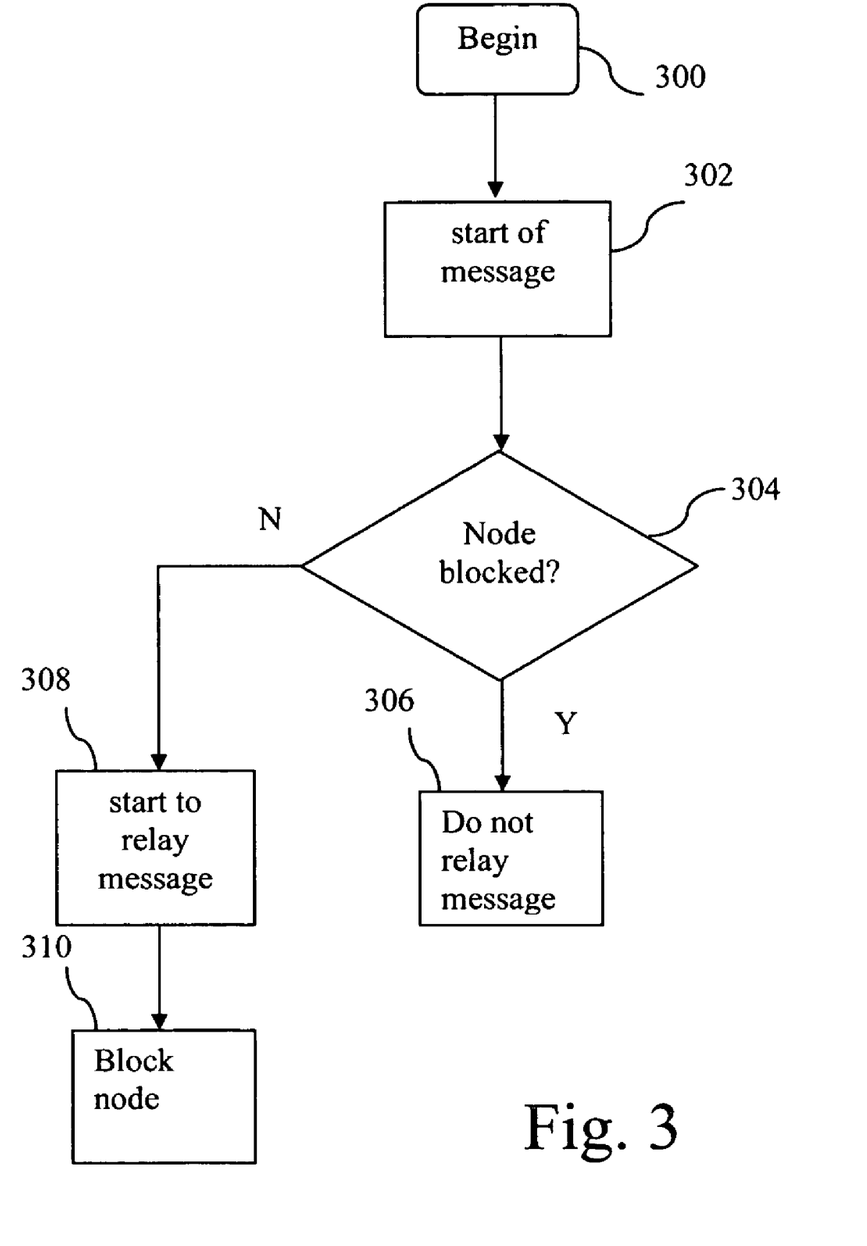
FIG. 3 is a flow chart of one embodiment of a process for a hub for limiting the influence of a node on a network in an unsynchronized state.

FIG. 3 is a flow chart of one embodiment of a process for a hub for limiting the influence of a node on a network in an unsynchronized state. The process begins at block 300 in a start-up enforcement paradigm. In this paradigm, the hub limits the influence of a node on start-up by controlling whether messages from a node are forwarded to other nodes or are blocked at the hub. In essence, the hub selectively blocks transmissions from a node, e.g., by not relaying messages, to limit its influence on the start-up process while in the unsynchronized state. When the network enters a synchronized state, the hub uses a conventional synchronous enforcement paradigm, with the guardian enforcing slot order or the guardian performing a fault tolerant arbitration schemes as detailed in the '782 Application, the '031 Application, the '785 Application, and the '459 Application.

At block 302, the process detects the start of a message from a node, e.g., by detecting a start-of-frame signal or flag. In other embodiments, any other activity on the channel is used to detect an attempt to transmit. At block 304, the process determines whether the node that is beginning to transmit is currently blocked. If the node is currently blocked, the process does not relay the message at block 306. If however, the node is not currently blocked, the process starts relaying the message at block 308. At block 310, the process instigates a block for all further messages from the node. This block is left in place for the node until a relaying condition is met such as determined by the processes described below in FIGS. 4, 5, and 6. It is noted that any one or more of the processes shown in FIGS. 4, 5 and 6 can run in parallel.

FIG. 4 is a flow chart of one embodiment of a process for removing a block on a node based on the time after a block is applied to the node at the hub. The process begins at block 402 when the block is applied to the node at the hub. At block 404, the process starts a timer. The timer is set to a value that allows the hub to determine if a sufficient period of time has elapsed such that entry into the synchronous state would normally have occurred. The value of this timer is long enough for the message to be recognized and synchronous operation to commence. Further, the time should be longer than it takes for good nodes, having observed the transmission to back off, and one to send another subsequent start-up message, e.g., enough time for a failed start-up attempt to be recognized and a subsequent start up attempt initiated by another node to commence. With this, the time delay ensures that another node will have enough time to back off and recover from any erroneous behavior caused by the original sourced node, such that another node will source a good message and so start the network. At block 406, the process determines whether the timer has expired. If so, the hub removes the block for the node at block 408. If sufficient time has not passed, then the hub retains the block on the node and returns to block 406 to determine whether the timer has expired.

Figure 5:
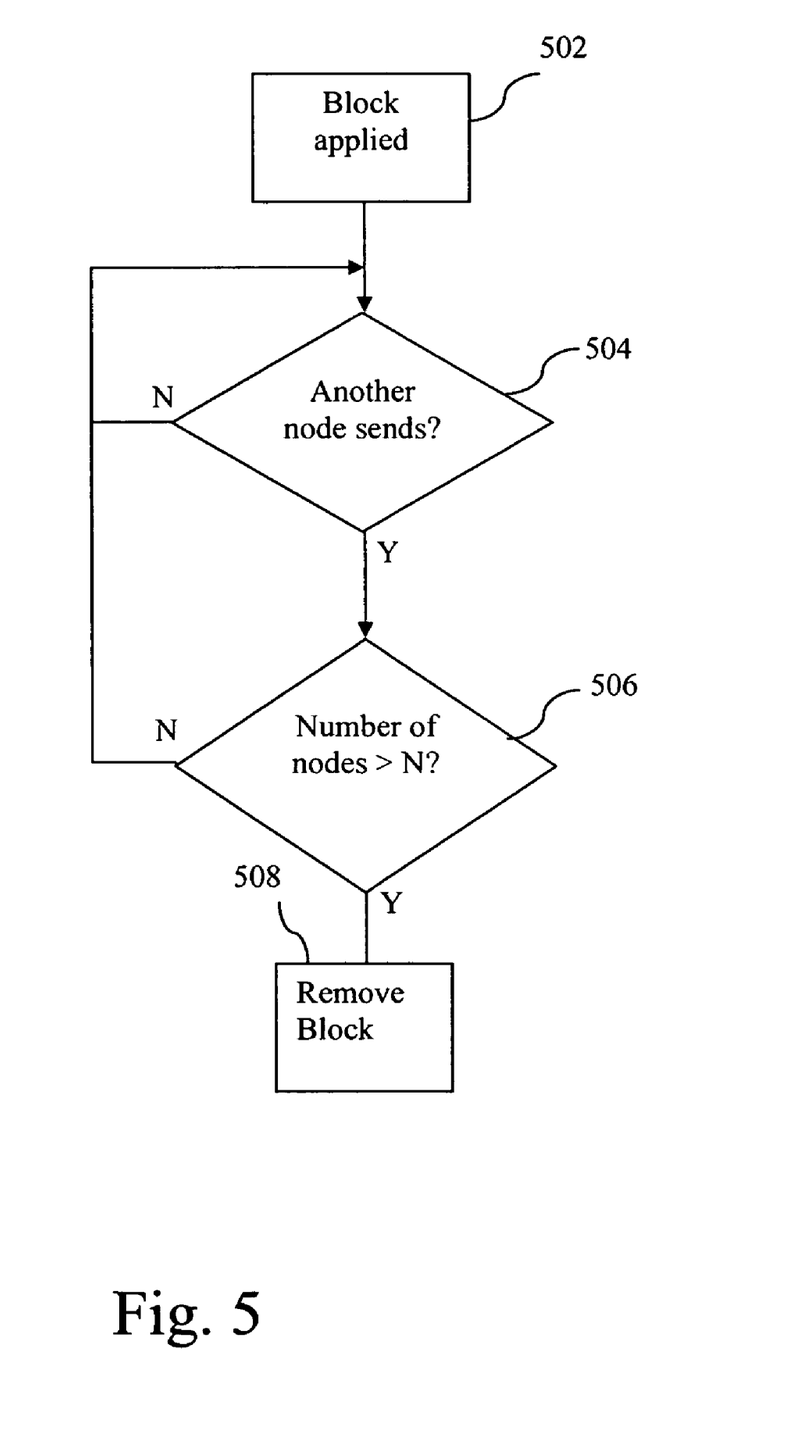
Figure 6:
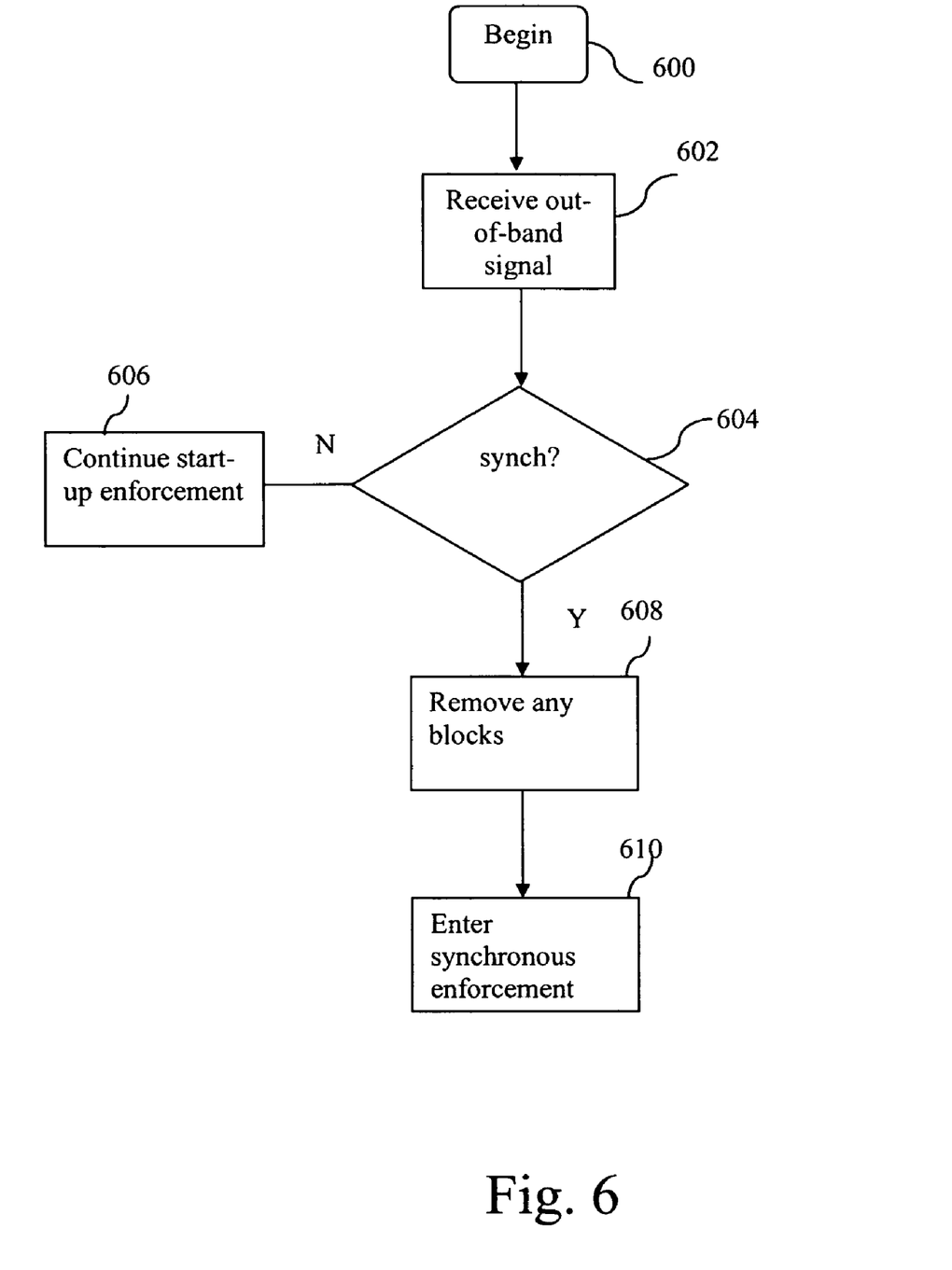

FIG. 5 is a flow chart of one embodiment of a process for removing a block on a node based on the number of nodes that have transmitted in the unsynchronized state. In one embodiment, the hubs track the number of transmissions from each node during the unsynchronized state. In one embodiment, the hub blocks messages from a node until messages from a number of nodes equal to the number of channels in the network have been transmitted.

The process begins at block 502 when the block is applied to the node. At block 504, the process determines whether another node has transmitted since the last message from the node. If a node has not transmitted, the process returns to block 504. If, however, another node has transmitted, the process proceeds to block 506. At block 506, the process determines whether the number of nodes that has transmitted is greater than or equal to N. In one embodiment, the number N is equal to the number of channels in the network. In another embodiment, the number N is equal to the number of channels that a node is allowed to attempt start-up of the network. If the process determines that the appropriate number of nodes has transmitted, then the block is removed at block 508 and the node is allowed to transmit.

FIG. 6 is a flow chart of one embodiment of a process for removing a block on a node based on entry into the synchronous state. At block 602, the process receives an out-of-band signal that indicates the synchronization state of the network. In one embodiment, the out-of-band signals are beacons, e.g., action time signals, as described in provisional application Ser. No. 60/523,783 entitled "PARASITIC TIME SYNCHRONIZATION FOR A CENTRALIZED TDMA BASED COMMUNICATIONS GUARDIAN" filed on Nov. 19, 2003 and non-provisional application Ser. No. 10/993,221 entitled "PARASITIC TIME SYNCHRONIZATION FOR A CENTRALIZED TDMA BASED COMMUNICATIONS GUARDIAN," filed on even date herewith. According to the TTP/C Standard, these action time signals indicate the determination of each node as to the beginning of the next time slot. In one embodiment, the out-of-band signals are guardian messages for voted schedule enforcement as described in co-pending provisional application Ser. No. 60/523,896 entitled "VOTING MECHANISM FOR TRANSMISSION SCHEDULE ENFORCEMENT," filed on Nov. 19, 2003 and non-provisional application Ser No. 10/993,910 (400.006US01) entitled "VOTING MECHANISM FOR TRANSMISSION SCHEDULE ENFORCEMENT" filed on even date herewith. In other embodiments, any appropriate out-of-band signal is used that indicates the state of the network as synchronous or non-synchronous.

The process determines, at block 604, whether the network is in a synchronized state based on the out-of-band signal. The state of synchronization determines whether the hub exits the start-up enforcement paradigm and enters the synchronous enforcement paradigm. At block 606, the process continues start-up enforcement when the out-of-band signals indicate that the network is in an unsynchronized state. At block 608, the process removes any blocks and enters the synchronous enforcement at block 610 when the out-of-band signal indicates that the network is in a synchronous state.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions on a machine readable medium to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices or machine readable medium suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method for controlling start-up of a network, the method comprising:
    receiving a message from one node of a plurality of nodes at a hub while the network is in an unsynchronized state;
    relaying the message to the other nodes of the plurality of nodes without analyzing the content of the message; and
    when the network remains in an unsynchronized state, blocking all subsequent messages from the one node of the plurality of nodes until a synchronous state is detected, or a select number of nodes of the plurality of nodes has transmitted a message.

2. The method of claim 1, and further including detecting the state of synchronization of the network based on out-of-band signaling.

3. The method of claim 1, and further including monitoring signals received at the hub to detect entry into the synchronous state.

4. The method of claim 3, wherein monitoring signals comprises monitoring for at least one of beacons from the plurality of nodes or guardian messages for voted schedule enforcement.

5. The method of claim 3, wherein blocking all subsequent messages comprises not relaying the subsequent message independent of the content of the message.

6. A method for controlling staff-up of a network, the method comprising:
    receiving a message from one node of a plurality of nodes at a hub while the network is in an unsynchronized state;
    relaying the message to the other nodes of the plurality of nodes of the network independent of the content of the message; and
    blocking all subsequent messages from the one node at the hub from being forwarded to other nodes of the plurality of nodes until the network is synchronized or a select number of other ones of the plurality of nodes have transmitted a message in the unsynchronized state.

7. The method of claim 6, wherein blocking all subsequent messages comprises failing to relay subsequent messages to other nodes in the network independent of the content of the message.

8. A method for controlling staff-up of a network, the method comprising:
    receiving a message from one node of a plurality of nodes at a hub while the network is in an unsynchronized state;
    relaying the message to the other nodes of the plurality of nodes of the network independent of the content of the message; and
    blocking all subsequent messages from the one node of the plurality of nodes until a relaying condition is met.

9. The method of claim 8, wherein blocking all subsequent messages comprises blocking all subsequent messages from the one node until the network enters a synchronous state, or a select number of other nodes of the plurality of nodes transmits a message.

10. A network, comprising:
    at least one hub;
    a plurality of nodes coupled to the at least one hub in a star configuration;
    wherein the at least one hub and the plurality of nodes communicate using a time-triggered protocol; and
    wherein the hub allows each node to transmit one message on the network in an unsynchronized state before the hub blocks messages on the network from that node.

11. The network of claim 10, wherein the hub blocks all subsequent messages from the node in the unsynchronized state until at least one other node has transmitted a message in the unsynchronized state.

12. The network of claim 10, wherein the hub blocks all subsequent messages in an unsynchronized state until a number of nodes of the plurality of nodes equal to the number of channels in the network has transmitted a message in the unsynchronized state.

13. A machine-readable storage medium having instructions stored thereon for a method for controlling start-up of a network, the method comprising:
    receiving a message from one node of a plurality of nodes at a hub while the network is in an unsynchronized state;
    relaying the message to the other nodes of the plurality of nodes without analyzing the content of the message;
    monitoring the state of synchronization of the network; and
    when the network remains in an unsynchronized state, blocking all subsequent messages from the one node of the plurality of nodes until a synchronous state is detected.

14. The machine-readable storage medium of claim 13, and further comprising ceasing to block messages from a node once a select number of other nodes of the plurality of nodes has transmitted a message.

15. The machine-readable storage medium of claim 13, wherein monitoring the state of synchronization comprises monitoring an out-of-band signal.

16. The machine-readable storage medium of claim 13, wherein monitoring the state of synchronization comprises monitoring beacon signals sent from the plurality of nodes to the hub.

17. The machine-readable storage medium of claim 13, wherein monitoring the state of synchronization comprises monitoring a guardian message used for voted schedule enforcement.

18. A machine-readable storage medium having instructions stored thereon for a method for controlling start-up of a network, the method comprising:
    receiving a message from one node of a plurality of nodes at a hub while the network is in an unsynchronized state;
    relaying the message to the other nodes of the plurality of nodes of the network independent of the content of the message; and
    blocking all subsequent messages from the one node of the plurality of nodes until a relaying condition is met.

19. The machine-readable storage medium of claim 18, wherein blocking all subsequent messages comprises blocking all subsequent messages from the one node until the network enters a synchronous state, or select number of other node of the plurality of nodes transmits a message.

20. A method for controlling start-up of a network, the method comprising:
receiving a message from one node of a plurality of nodes at a hub while the network is in an unsynchronized state;
relaying the message to the other nodes of the plurality of nodes without analyzing the content of the message; and
when the network remains in an unsynchronized state, blocking all subsequent messages from the one node of the plurality of nodes until a select number of nodes of the plurality of nodes has transmitted a message.

21. The method of claim 20, wherein blocking all subsequent messages from the one node of the plurality of nodes until a select number of nodes of the plurality of nodes has transmitted a message comprises blocking all messages from the one node of the plurality of nodes until a number of nodes of the plurality of nodes equal to the number of channels have transmitted in the unsynchronized state.

22. The method of claim 20, wherein blocking all subsequent messages comprises not relaying the subsequent message independent of the content of the message.

23. The method of claim 20, wherein blocking all subsequent messages from the one node of the plurality of nodes until a select number of nodes of the plurality of nodes has transmitted a message comprises blocking all subsequent messages from the one node of the plurality of nodes until a number of nodes of the plurality of nodes equal to the number of channels a node is authorized to transmit on have transmitted in the unsynchronized state.

24. The method of claim 20, and further comprising unblocking the one node when the select number of nodes has transmitted in the unsynchronized state.

* * * * *